United States Patent
Hariri et al.

(10) Patent No.: US 11,977,649 B2
(45) Date of Patent: May 7, 2024

(54) EMBEDDING SHARED INSTANCES OF COLLABORATIVE DATA ACROSS DIFFERENT APPLICATIONS

(71) Applicant: Google LLC, Mountain View, CA (US)

(72) Inventors: Behnoosh Hariri, New York, NY (US); Konstantin Yakovlev, Zurich (CH)

(73) Assignee: Google LLC, Mountain View, CA (US)

( * ) Notice: Subject to any disclaimer, the term of this patent is extended or adjusted under 35 U.S.C. 154(b) by 288 days.

(21) Appl. No.: 17/489,294

(22) Filed: Sep. 29, 2021

(65) Prior Publication Data
US 2023/0094081 A1  Mar. 30, 2023

(51) Int. Cl.
*G06F 21/62* (2013.01)
*G06F 8/65* (2018.01)

(52) U.S. Cl.
CPC ............ *G06F 21/6209* (2013.01); *G06F 8/65* (2013.01)

(58) Field of Classification Search
CPC ................................ G06F 21/6209; G06F 8/65
See application file for complete search history.

(56) References Cited

U.S. PATENT DOCUMENTS

| | | |
|---|---|---|
| 10,984,484 B1 | 4/2021 | Nidecker et al. |
| 2007/0294366 A1 | 12/2007 | Ozzie et al. |
| 2008/0313281 A1 | 12/2008 | Scheidl et al. |
| 2009/0037492 A1 | 2/2009 | Baitalmal et al. |
| 2013/0013560 A1* | 1/2013 | Goldberg ............... G06F 16/178 707/634 |
| 2014/0164080 A1 | 6/2014 | Thompson, Jr. et al. |
| 2015/0142719 A1 | 5/2015 | Behuria |
| 2019/0213528 A1 | 7/2019 | Gupta et al. |
| 2019/0318418 A1* | 10/2019 | Khurana ............ G06Q 30/0635 |

(Continued)

FOREIGN PATENT DOCUMENTS

| | | |
|---|---|---|
| WO | 0161552 A2 | 8/2001 |
| WO | 2017/178818 A1 | 10/2017 |

OTHER PUBLICATIONS

PCT International Search Report and Written Opinion for International Application No. PCT/US2022/045107, dated Jan. 10, 2023, 14 pages.

(Continued)

*Primary Examiner* — Ayoub Alata
(74) *Attorney, Agent, or Firm* — Lowenstein Sandler LLP

(57) ABSTRACT

In an implementation, a method includes causing a source application data object to be embedded in a host application file and recording information associated with the source application data object in a common data store. It further includes identifying a modification made to the embedded source application data object, sending a notification to the source application to update a corresponding source copy of the source application data object based on the modification made to the embedded source application data object, and recording the modification in the common data store. The method also includes identifying a change made to the source copy of the source application data object, and causing the host application to update the embedded source application data object in the host application data store according to access permissions of the host application file, and recording the change in the common data store.

20 Claims, 6 Drawing Sheets

(56) References Cited

U.S. PATENT DOCUMENTS

2021/0073713 A1    3/2021    Balasubramanian et al.

OTHER PUBLICATIONS

PCT International Search Report and Written Opinion for International Application No. PCT/US2022/045263, dated Jan. 17, 2023, 28 pages.
Kyber, "Kyber Guide", https://kyber.me/kyber-for-slack-how-todo-list-task-project-management-calendar-reminders/, 72 pages, [retrieved from the internet on Sep. 28, 2021].
Adobe, "Working with To-do lists", https://helpx.adobe.com/in/experience-manager/6-3/forms/using/todo-lists.html, 4 pages, Nov. 23, 2017.
Broadcom, "New User Experience: View My Tasks or My Team Tasks", https://techdocs.broadcom.com/us/en/ca-enterprise-software/business-management/clarity-project-and-portfolio-management-ppm-on-demand/15-4-1/using/getting-started-with-the-new-user-experience/new-user-experience-view-my-tasks-ormy-team-tasks.html, 5 pages, Aug. 1, 2019.
Belshaw, Doug, Use 'Action Items' in Google Docs to Turn Comments Into Tasks for Your Team, https://shift.newco.co/2016/12/13/use-action-items-in-google-docs-to-turn-comments-into-tasks-for-your-team/, 4 pages, Dec. 13, 2016.

\* cited by examiner

EMBEDDING SHARED INSTANCES OF COLLABORATIVE DATA ACROSS DIFFERENT APPLICATIONS

TECHNICAL FIELD

Aspects and implementations of the present disclosure relate generally to sharing data across collaborative applications, and more particularly relate to embedding shared instances of collaborative data across different applications.

BACKGROUND

Productivity applications, often grouped into suites of interactive applications such as those used for producing documents, presentations, worksheets, databases, charts, graphs and other material have become widespread work environments. In some situations, applications enable more than one user to access or modify a file in order to facilitate collaborative work and expedite the completion of a work product. It has become increasingly important, especially for web applications and cloud-based applications to provide flexibility of access and sharing of data between instances of applications and files shared between different users. The distributed nature of the application platforms and the geographical distance of the collaborators from one another can entail data being stored or accessed from different locations and transmitted across state borders. This has, in turn, lead to the implementation of a variety of data storage, access, retention and modification policies that can be subject to the rules of different jurisdictions in order to comply with the applicable rules.

SUMMARY

The below summary is a simplified summary of the disclosure in order to provide a basic understanding of some aspects of the disclosure. This summary is not an extensive overview of the disclosure. It is intended neither to identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In some implementations, a system and method are disclosed. In an implementation, a method includes causing, by a processing device, a source application data object to be embedded in a host application file and recording information associated with the source application data object in a common data store, where the information associated with the source application data object is also recorded in a host application data store and a source application data store. It further includes identifying a modification made to the embedded source application data object via a host application user interface, sending a notification to the source application to update a corresponding source copy of the source application data object in the source application data store based on the modification made to the embedded source application data object, and recording the modification made to the embedded source application data object in the common data store, as well as identifying a change made to the source copy of the source application data object via a source application user interface. The method also includes causing the host application to update the embedded source application data object in the host application data store based on the change made to the source copy of the source application data object and according to access permissions of the host application file, and recording the change made to the source copy of the source application data object in the common data store.

In some implementations, identifying the change made to the source copy of the source application data object includes receiving a notification, initiated by the source application, regarding the change made to the source copy of the source application data object. Further, causing the host application to update the embedded source application data object in the host application data store can include determining whether the access permissions allow a user to make changes to the host application file, and responsive to a determination that the access permissions allow the user to make changes to the host application file, causing the embedded source application data object to be updated in the host application data store with the change made by the user. In some implementations, the method further includes identifying a second change made to the source copy of the application data object by a second user, as well as determining whether the access permissions allow the second user to edit the host application file, and responsive to a determination that the access permissions prohibit the second user from editing the host application file, generating a notification referring to the source application data object for users with access permissions that allow editing of the host application file, the notification indicative of the change made by the second user.

In other implementations, the method can also include, upon identifying the modification made to the embedded source application data object via the host application user interface, periodically resending the notification to the source application to update the corresponding source copy of the source application data object in the source application data store until a confirmation of a successful update is generated, as well as periodically performing a data inconsistency check of the information associated with the source application data object between the host application data store and the common data store. The method can further include, responsive to detecting a data inconsistency, updating data recorded in the host application data store based on corresponding data recorded in the common data store as well as responsive to detecting a data inconsistency, generating a notification referring to the data inconsistency associated with the source application data object for users with access permissions that allow editing of the host application file.

In some implementation, a system includes a memory device; and a processing device coupled to the memory device, where the processing device is configured to cause a source application data object to be embedded in a host application file. The processing device can further be configured to record information associated with the source application data object in a common data store, wherein the information associated with the source application data object is also recorded in a host application data store and a source application data store, and identify a modification made to the embedded source application data object via a host application user interface. The processing device can also be configured to send a notification to the source application to update a corresponding source copy of the source application data object in the source application data store based on the modification made to the embedded source application data object, and record the modification made to the embedded source application data object in the common data store. The processing device can further be configured to identify a change made to the source copy of the source application data object via a source application user interface, and cause the host application to update the embedded source application data object in the host application data store based on the change made to the source copy of the source application data object and according to access permissions of the host application file, and record the change made to the source copy of the source application data object in the common data store.

In some implementations, a non-transitory computer readable storage medium includes instructions that, when executed by a processing device, cause the processing device to cause a source application data object to be embedded in a host application file, record information associated with the source application data object in a common data store, where the information associated with the source application data object is also recorded in a host application data store and a source application data store. They also cause the processing device to identify a modification made to the embedded source application data object via a host application user interface, and send a notification to the source application to update a corresponding source copy of the source application data object in the source application data store based on the modification made to the embedded source application data object, and record the modification made to the embedded source application data object in the common data store. The instructions can further cause the processing device to identify a change made to the source copy of the source application data object via a source application user interface, and cause the host application to update the embedded source application data object in the host application data store based on the change made to the source copy of the source application data object and according to access permissions of the host application file, and record the change made to the source copy of the source application data object in the common data store.

The foregoing summary of the present invention with the preferred embodiments should not be construed to limit the scope of the invention. It should be understood and obvious to one skilled in the art that the embodiments of the invention thus described may be further modified without departing from the spirit and scope of the invention.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
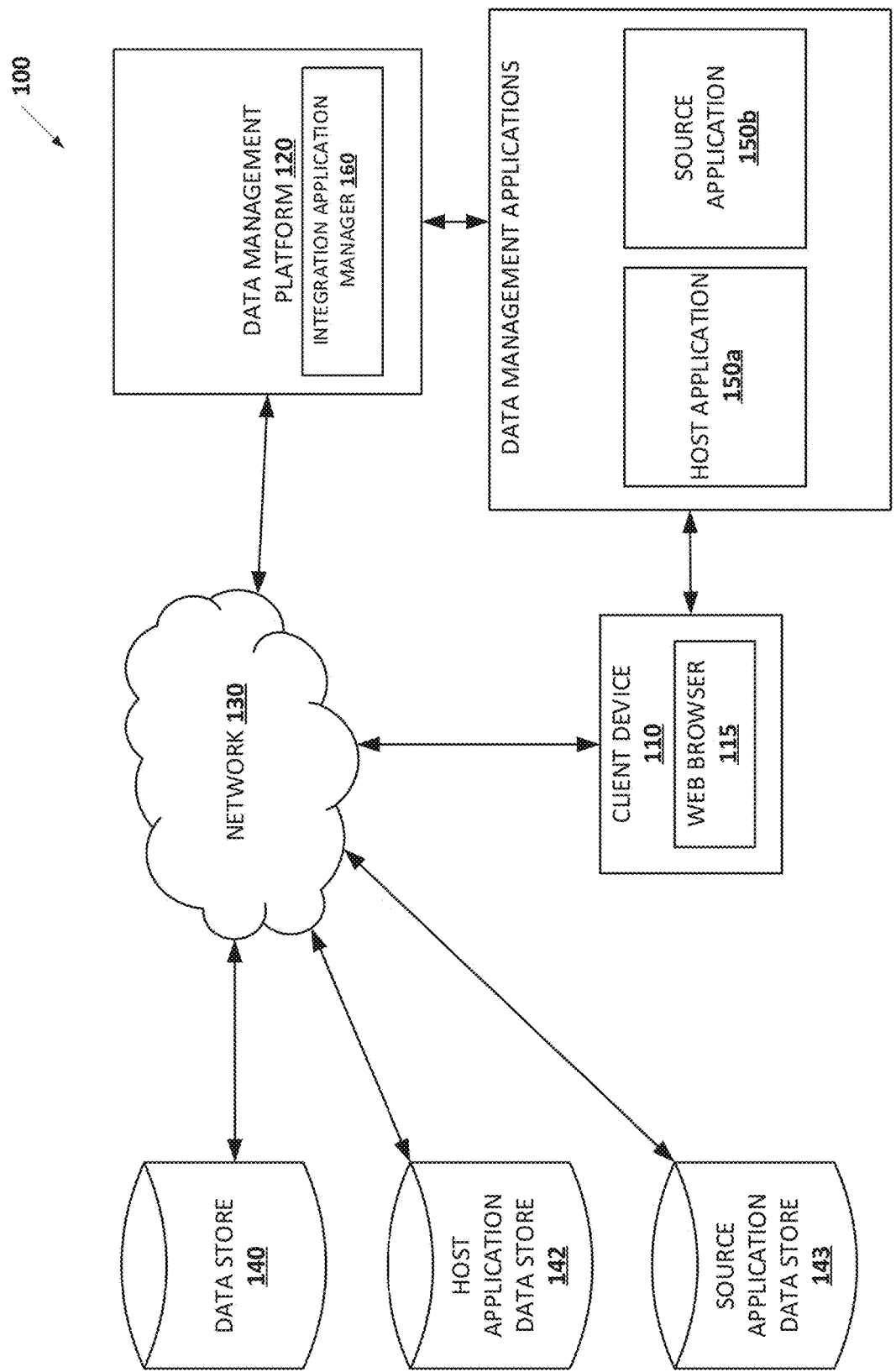
FIG. 1 illustrates an example system architecture, in accordance with implementations of the present disclosure.

Aspects of the present disclosure relate to sharing embedded instances of collaborative data between different applications. A variety of application platforms have become available for users to aid with productivity, content creation, and common work related activities. Accordingly, a variety of productivity suites including applications for producing and editing documents, presentations, worksheets, databases, charts, etc. have become widespread work environments. Further, such applications can be implemented in distributed cloud-based platforms that are web-based and allow collaboration between teams of users.

In view of these possibilities, a trend has developed of an ever increasing number of users taking advantage of the functionality offered by the plethora of web applications (e.g., email applications, document processing applications, calendar applications, spreadsheet applications, project management applications, etc.) that often form part of productivity suites, and collaboration has increasingly begun to involve a continual progression of activities across a variety of such application.

As a user's activities extend to using information available in disparate applications, the user often needs to switch between applications, context, windows, or interfaces in order to access the relevant information. Such switching between applications, interfaces, etc. is inconvenient to the user and can take significant time and computing resources. The implementations disclosed herein address the aforementioned problems by providing a mechanism that enables a user to access or modify data of one application in an interface of another application, thereby reducing the number of times that a user may need to switch between applications or interfaces. In one example scenario, a user may be working in a document through a word processing application and may want to assign a task to another user without leaving the context (e.g., interface) of the document. The mechanism disclosed herein allows the user to embed a "task" in the document that is associated with a "task" in a task management application, thereby eliminating the need for the user to switch to the task management application to assign the task to another user. In some implementations, embedding a "task" involves creating a data object representative of the task in the graphical user interface (GUI) of the word processing application as well as associating task data with or anchoring task data on a visual representation of the task in the GUI of the word processing application. This embedded task can then also be accessed and updated through a GUI of the task management application as well. Similar functionality can be implemented for various other application types where there is a need to maintain joint ownership over data by embedding information from one application into another (e.g., a spreadsheet application and a task management application where a task can be embedded into a cell or a row of a worksheet).

The data shared and stored by each of the two applications can be subject to different data policies (e.g., regarding data location, sharing, retention, etc.). For example, if a task is embedded in a document, the data policy that is applicable to the document may require the document data to be stored in the European Union (EU) while the data policy applicable to the task may require task data to be stored in the United States (US). In some implementations, to ensure compliance with different data policies, when data from one application (e.g., a source application) is embedded or generated in another application (e.g., a host application), each application can maintain separate copies of the data in separate respective locations so that each copy can conform to the compliance needs and requirements of the respective application or location. This separated data ownership approach can create a clear delineation for data ownership between the applications and create a data ownership model that avoids conflicts between policies.

Embedded data can be modified from both the host application (the application in which it is embedded) and the source application (the parent application from which the data type originates). Aspects of the present disclosure provide a mechanism for handling data changes that maintains data integrity between the applications with which the data is associated, thereby facilitating the interoperability of the applications and improving the user experience. For example, if data that is embedded in a host application gets deleted from a source application, this data also gets deleted from the host application via a notification queue system. Conversely, if source application data that is embedded in a host application gets deleted from a host application, it also gets deleted from the source application via the notification queue system. Some implementations can use a database feature that allows the delivery of reliable notifications between different systems (e.g., applications). For example, if a task data object gets deleted in a task management application, a notification queue system can be used to make sure that a word processing application in which a corresponding task data object is embedded is notified of the deletion. In one implementation, the data associated with the task can be deleted from an index table accessible by both application and then, eventually, deleted from the document of the word processing application in which the corresponding task data object is embedded. In another example implementation, when the task gets deleted in a task management application, a queue message with a notification of the deletion can be transactionally scheduled and then asynchronously invoked by a database system (e.g., at a later time) and retried until confirmation of a successful transmission/receipt of the notification.

In some implementations, to ensure that each application in which a particular source application data object is embedded is notified of a change (e.g., update, deletion, modification) to the source application data object occurring in the source application interface, each source application data object can have associated data with a record of each application in which it is embedded. As used herein with respect to a data object, the each of the terms "modification" and "change" shall be inclusive of "deletion". Accordingly, if a data object is edited or updated in its respective source application, a notification can be sent to the host application to update the embedded copy (e.g., the source application data object embedded in the host application file) that is also referred to herein as the corresponding "embedded data object". Conversely, if the embedded source application data object (embedded data object) is edited or updated from within a host application (e.g., through a host application interface), a notification can be sent to the source application to update the source copy of the data object (source application data object) that is also referred to herein as a corresponding "source data object". In some implementations, to ensure reliable delivery of the notification, the notification can be resent by the application through which the change occurred until a confirmation or acknowledgement of a receipt of the notification is received from the other application (i.e., the application to which the notification to update is sent).

In some situations, different access rules (e.g., permissions to view or edit the data) may pertain to the host application file and the embedded data. Aspects of the present disclosure provide a mechanism that can address conflicts between permissions to ensure that updates to data can be made without contravening access rules applicable to either the host application file or the embedded data. For example, modifications to embedded data objects in the host application can follow the access rules of the host application. This means that only users who have permission to edit or modify the host application according to the access permissions of the host application can edit or modify the embedded data. Accordingly, the source application can grant access to change a data object in the source application (the source application data object) to any user that has access permission to change the corresponding embedded data object in the host application.

Conversely, changes or updates made to the data object (source application data object) in the source application can update the embedded data object in the host application only when the update is issued on behalf of a user (the change is made by a user) who has access permission to make changes in the host application file where the data object is embedded. If the user making the change to the data object in the source application does not have access permissions to make changes to the host application file in which the data object is embedded, the change can remain in a pending state for another user who does have access permissions to make changes to the host application file to accept the change and update the host application file. For example, a change to a data object made in a source application can be recorded in a location accessible by both the source application and the host application but not committed to the host application file where the data is embedded due to a lack of access permissions. In this case, a notification can be presented to users of the host application who have access permissions allowing them to make changes to the host application file regarding the pending change and a prompt can be provided to them to either accept or reject the change.

In some embodiments, the access check (e.g., determination whether a user has the requisite access permissions to make a change to a particular data object) can happen at both the source application and the host application. In one example, the host application can always perform the access check since the source application always sends the notification regarding a change to the host application regardless of whether the change can be committed to the host application file where the data object to which the change is being made is embedded. In this case, as described in more detail below, the host application can take the changes made to the data object from either the source application or the host application and record them in another location (e.g., a third location separate from the location where host application data is recorded and the location where source application data is recorded). In another example, a task management application can check whether a user trying to make changes to a particular data object has the access permissions to edit the host application file in which the data object is embedded, and, if so, grant the user permission to edit the data in the source app and propagate the change to the host application.

In order to minimize conflicts resulting from changes to corresponding data objects in respective host and source application and to ensure that both the host application and the source application have up-to-date data objects, some implementations maintain a separate storage area (e.g., a data store) for recording data associated with the source application data objects that are embedded in a host application file. As noted earlier, if the source application and the host application have different access rules (e.g., sets of different access permissions for different users), the changes made to a data object in the source application may not be synced to the host application (e.g., the corresponding embedded data object may not be updated with the change) if the user making the change does not have access permission to make changes in the host application file. In order to ensure that such changes are not lost, they can be recorded in a separate storage that can serve as an ultimate "source of truth" regarding the data objects. In some implementations, each of the pair of applications can have data recorded in a respective data store. This third location can be a third data store where all changes pertaining to a data object (i.e., including a source application data object and the corresponding embedded data object) and their history are recorded from both the host application and the source application. In one implementation, this third storage location can be managed exclusively by the host application (e.g., records of changes to data are made by the host application regardless of whether the changes were made in the source application or the host application). The third storage location can include all of the source application data objects ever embedded in the host application file as well as all of the changes that were ever made to those data objects. For example, a word processing application can record in a separate data store all the task data objects that were ever embedded in the document from a task management application along with all of the changes that were previously made to those data objects. Having a third storage location that is separate from the storage location for respective data of each of the host and source application can lower computational costs and reduce data transfer loads if the third location is managed entirely by the host application. This is because such an arrangement can reduce the number of queries and transfers of data between applications and their respective data stores along with the associated computational costs and network bandwidth especially if and when they are located in geographically distant locations.

This third storage area can serve as a source of truth (e.g., reliable source of information regarding a data object) because the host application file (also referred to herein as an "embedded data container") can change in a way that results in stale embedded data. For example in a scenario with a word processing application file that has an embedded task data object that was marked as completed, the word processing application file can be reverted to an earlier version where the embedded task data object was not marked as completed resulting in stale (e.g., outdated, inaccurate) embedded task data object. In another example, update notifications resulting from a change to an embedded data object occurring in a host application can permanently fail to be delivered to a source application (e.g., due to a disabled account) and result in an undesirable discrepancy between the source copy of the data object and the embedded data object. Having a third location containing a record of the embedded data objects can obviate the need of preventing users of the host application file with embedded data objects from reverting the host application file to an earlier version if one desires to maintain an up-to-date representation of the embedded data object.

In some implementations, a third storage location can be an index table in a data store with records of data objects associated with each of a pair of applications. In some implementations, a host application can maintain a separate storage location for all embedded data that has been successfully synced with the source application and can update the storage location according to notification of data changes received from the source application even if the change cannot be committed to the host application embedded data container (host application file with the corresponding embedded data object) due to access permission limitations. In some implementations, this storage location may be realized as an embedded data index table and access (e.g., permission to modify) to this table can be granted to any user that has permission to make changes to a data object in either the source application or the host application. To ensure consistency of data between the source application and the third storage location (e.g., embedded data index table), a periodic consistency check verification can be performed between the storage location of the source application data and the third storage location. Similarly, a periodic consistency check verification can be performed between the storage location of the host application data and the third storage location. If an inconsistency in the data between the two locations is identified, an alert or notification can be issued or generated. The notification regarding the inconsistency between the third storage location and a storage location of the respective host or source application data can be presented to users of the respective application. For example, the host application can use an embedded index table as a source of truth for all embedded data and show a warning to a user when the embedded data in a host application embedded data container is out of sync with the index table. Further details regarding the structure of and operations performed by elements of the systems and methods described herein are described below with reference to FIGS. 1-6.

Accordingly, aspects of the present disclosure provide a number of technical advantages including, for example, a mechanism that can conveniently embed data from one application into another application, thereby creating deeper integration between the applications and reducing time and computing resources that would be otherwise consumed by repeated context switching (e.g., switching between applications or interfaces) done by a user. Other technical advantages include, but are not limited to, providing automated solutions to ensure compliance with potentially conflicting policies with respect to data shared and stored by the applications, implement data integrity between the applications, and address conflicts between data access permission across the applications, thereby facilitating further interoperability of the applications, further improving the user experience, and further reducing time and computing resources that would be otherwise consumed by manually addressing conflicting data policies, manually ensuring data integrity or manually addressing conflicts between data access permission across the applications.

Although the examples and implementations described herein may focus on particular types of applications such as document/word processing applications and task management applications, it should be understood that the systems and methods disclosed herein can analogously be implemented in a variety of applications and operating environments.

FIG. 1 illustrates an example system architecture 100, in accordance with implementations of the present disclosure. The system architecture 100 (also referred to as "system" herein) includes at least one client device 110 that can connect to servers, such as data management platform 120

(e.g., server(s)), via a network 130. One client device 110 and one data management platform 120 are illustrated as connected to network 130 for simplicity. In practice, there may be more clients and/or servers. Also, in some instances, a client may perform one or more functions of a server and a server may perform one or more functions of a client. Client device 110 may access or receive information from data management platform 120. The system architecture 100 can represent a cloud-based environment, which can enable communication between server(s) hosting document platform 120 and client devices 110 over the network 130 to store and share electronic documents. Alternatively, the system architecture 100 can apply to systems that are locally interconnected. Further, although some aspects of the disclosure are described with reference to spreadsheets and document applications managing spreadsheets, it should be understood to those skilled in the art that the systems, methods, functions, and embodiments of the present disclosure can apply to any type of electronic documents and any type of programs or services offered by any type of host applications.

In implementations, network 130 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. Client device 110 can include a computing device such as personal computer (PC), laptop, mobile phone, smart phone, tablet computer, netbook computer, network-connected television, etc. The client device 110 can be associated with one or more users, and the client device 110 can also be referred to as a "user device."

In the implementation shown, data management platform 120 may interact with client device 110 such that client device 110, in conjunction with data management platform 120, execute one or more data management applications to manage various documents. For example, the data management applications can be online data management applications, web applications, cloud-based applications, client-based data management applications, etc. In some implementations, data management applications are cloud-based or web-based productivity suite applications that can interact with a web browser 115 (rather than a designated document application) to, for example, present documents, receive user input related to the documents, etc. Alternatively, the data management applications can be client-based applications (hosted by client device 110) that provide functionality described herein with or without the use of document platform 120. The data management applications can include, for example, email applications, document processing applications, calendar applications, spreadsheet applications, project management applications, online word processing application, online task management application, etc. and can serve as a host application 150a or a source application 150b. It should be understood that a host application 150a can contain embedded data objects from source application 150b.

Data management structures created by the client device 110 may be stored in, for example, data store 140, host application data store 142, and source application data store 143 and can include application data objects, embedded data containers, and data associated with application graphical user interfaces of one or more host applications 150a or source applications 150b. In some cases, host application 150a can have exclusive access to the host application data store 142, the source application 150b can have exclusive access to source application data store 143, and both applications can have access to data store 140 which can serve as a common data store. Although illustrated as a single device in FIG. 1, data management platform 120 may be implemented as, for example, a single computing device or as multiple distributed computing devices. It should be understood and appreciated that whether a device is functioning as a server or a client device can depend on the specific application being implemented. That is, whether a computing device is operating as a client or a server may depend on the context of the role of the computing device within the application. The relationship of client device and server can arise by virtue of program executing on the respective devices and having a client-server relationship to each other.

As discussed above, the interaction of client device 110 with data management platform 120 may be implemented through a web browser 115 executed at client device 110. For example, a data management application such as one of a host application 150a or a source application 150b may be a web application that runs within the web browser 115. The term browser program is intended to refer to any program that allows a user to browse markup documents (e.g., web documents), regardless of whether the browser program is a stand-alone program or an embedded program, such as a browser program included as part of an operating system. In some implementations, the data management applications, as described herein are implemented as distributed web applications in which portions of each of the data management application execute at one or more of client device 110 and at data management platform 120. More specifically, the client devices 110 may request the data management application from data management platform 120. In response, data management platform 120 may transmit portions of the data management application for local execution at clients 110. The data management applications may thus execute as respective distributed applications across data management platform 120 and one or more of the client devices 110. In this manner, client device 110 may not be required to install any data management application locally to use the data management application hosted by the data management platform 120.

In general, functions described in implementations as being performed by the data management platform 120, by host application 150a, or source application 150b, can also be performed on the client device 110 in other implementations, if appropriate. In addition, the functionality attributed to a particular component can be performed by different or multiple components operating together. The data management platform 120 can also be accessed as a service provided to other systems or devices through appropriate application programming interfaces.

In some implementations, data management platform 120 can include an integration application manager 160 that manages communication and acts as intermediary between host application 150a and source application 150b. In other embodiments, integration application manager 160 can reside partially or entirely on client device 110. In yet some other implementations, host application 150a and source application 150b can be hosted by client device 110 and communicate with each other (e.g., via inter-process communication, using a shared data store, etc.) without the use of integration application manager 160.

In implementations of the disclosure, a "user" can be represented as a single individual. However, other implementations of the disclosure encompass a "user" being an entity controlled by a set of users and/or an automated source. For example, a set of individual users federated as a community in a social network can be considered a "user." In another example, an automated consumer can be an automated ingestion pipeline, such as a topic channel, of the content sharing platform 120.

A document, as described herein, may be implemented as a distributed web application in which portions of the application execute at multiple client devices 110 and at the document platform 120 to provide for collaboration among multiple users working on a single document. For example, multiple users may simultaneously or concurrently edit such a collaborative document and view the edits of each of the users in real time or near real time (e.g., within a few milliseconds or seconds). When one user edits the document, the edit may be transmitted to the document platform 120 and then forwarded to other collaborating users that are also editing or viewing the spreadsheet. To this end, the document platform 120 may handle conflicts between collaborating users, such as when two users try to simultaneously edit a portion of the document. For example, the document platform 120 may accept the first edit received or in some way prioritize the collaborating users such that the edits of higher priority users override those of lower priority users. If an edit of a user is rejected by the document platform 120, the document platform 120 may transmit a message back to the user that informs that user of the rejection of the edit. In this manner, multiple users may collaborate, potentially in real-time (or near real-time), on a single document. In some implementations, the parties that view and collaborate on a particular document may be specified by an initial creator of the document. For example, the initial creator of the document may be given "administrator" privileges that allow the creator to specify the privileges for each of the other possible collaborators. The initial creator may specify that the other collaborators have privileges to do one or more of the following: edit the document, view the document only, edit designated parts of the document, or add additional users to the list of possible collaborators. For example, certain users may be able to edit certain parts of the document, while other designated portions of the document can be "locked" to those users such that the users can view but not edit the locked portions. In some implementations, a document may be designated as a "public" document that anyone can view and/or edit.

Figure 2:
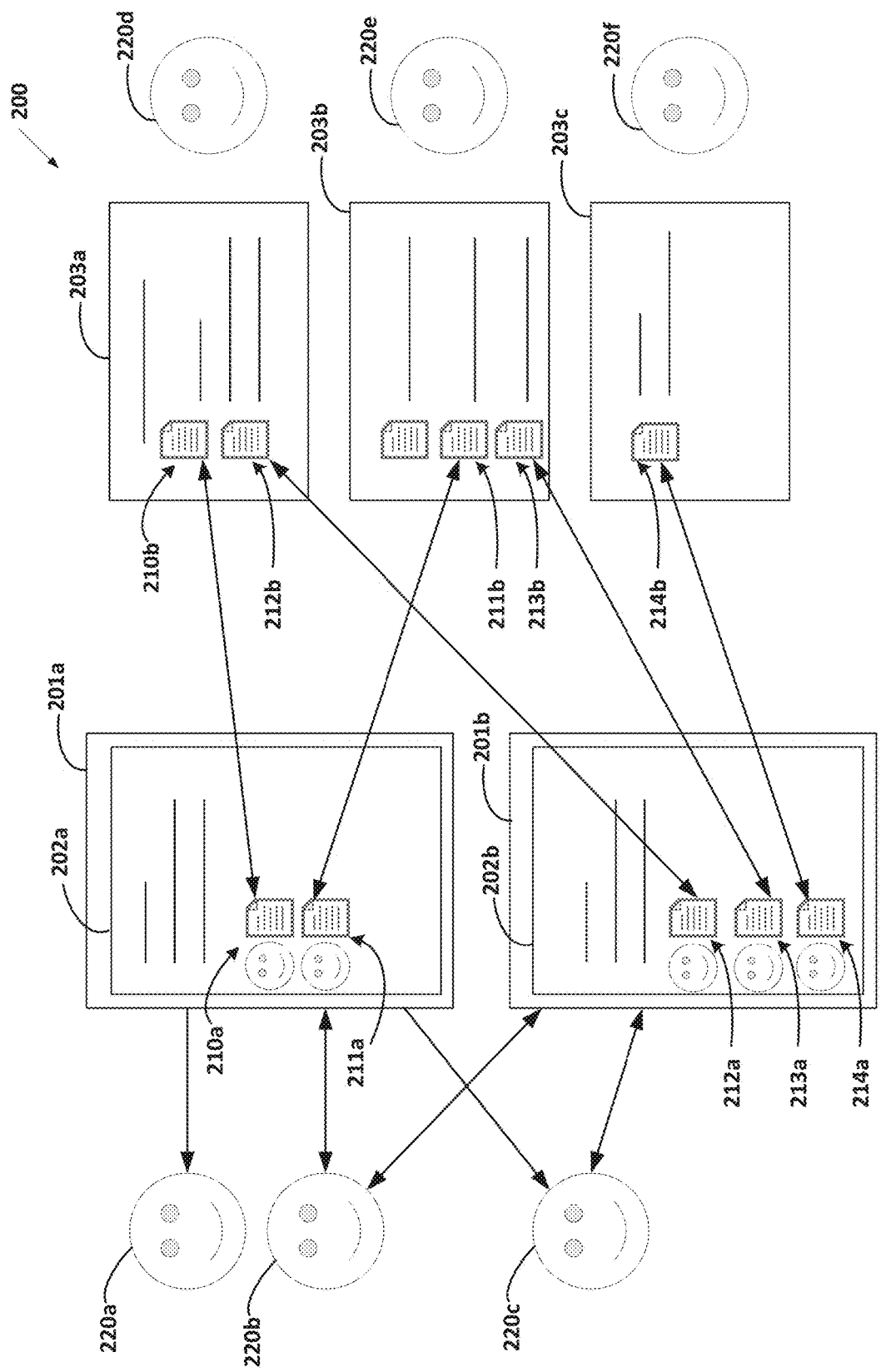
FIG. 2 is a diagram illustrating the sharing of data between instances of different applications, in accordance with implementations of the present disclosure.

As further explained with reference to FIG. 2, which depicts the sharing of data between instances of different applications in a data management platform 200, in accordance with implementations of the present disclosure, the functions and operations described can be performed with system 100 described above. Data management platform 200 may include one or more applications such as host application 150a and source application 150b.

In some implementations, host application 150a can provide one or more host application graphical user interfaces 201a and 201b through which a user can access one or more host application files 202a and 202b respectively. Host application files 202a and 202b can be understood to be data containers as they may contain a variety of data types and formats and can include embedded data objects. For example, as depicted in FIG. 2, host application file 202a can have data objects that are associated with a source application and are embedded by anchoring or logical association with a visual element in a host application graphical user interface 201a and serve as embedded source application data objects 210a and 211a. Analogously, host application file 202b can have three embedded data objects such as embedded source application data objects 212a, 213a, and 214a. Each of the embedded data objects 210a-214a (also referred to herein as an "embedded data object") can correspond to a source application data object 210b-214b (also referred to herein as a "source copy of the data object"). Each data object of a pair of corresponding data objects (e.g. 212a and 212b) can be updated based on changes made to the other object in the pair.

In the depicted implementation, source application data objects 210b-214b can be displayed, accessed, and modified through respective source application graphical user interfaces 203a-203c allowing a user to interact with, for example, source application 150b. For example, source application graphical user interface 203b can include visual representations of source application data object 211b and source application data object 213b along with respective data and information associated with each object.

In some implementations, data access policies or access permissions can control who is permitted to view or make changes to data contained in the applications via the respective user interfaces. For example, as represented by the unidirectional arrow, user 220a can have viewing permission to host application file 202a through host application interface 201a but not edit permission (i.e., permission to make any changes) for the data contained in the file of the host application. On the other hand, user 220b, can, as indicated by the bidirectional arrow, have both viewing permission and editing permission with respect to the host application file 202a and host application file 202b. Analogously, user 220c has viewing permission for host application file 202a and both viewing and editing permission for host application file 202b. In some implementations, if a user has the requisite permissions to edit the data of a host application file, the user can also thereby edit the data objects embedded in that file including, for example, embedded source application data objects 210a-214a.

Source application graphical user interfaces 203a-203c can be exclusively accessible to a particular user. For example, in the depicted implementation, source application graphical user interface 203a along with the included source application data objects 210b and 212b can be exclusively accessible to user 220d. Similarly, source application graphical user interface 203b along with the included source application data objects 211b and 213b can be exclusively accessible to user 220e and source application graphical user interface 203c along with the included source application data object 214b can be exclusively accessible to user 220f. Instances or respective copies of the data objects can be updated by changes made via either one of the graphical user interfaces (GUIs) of either the host application or the source application. Maintenance of current up-to-date copies of data objects in each respective application through updates and notification of changes to the data of the data objects, as can be understood in more detail with reference to FIG. 3 described below.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Figure 3:
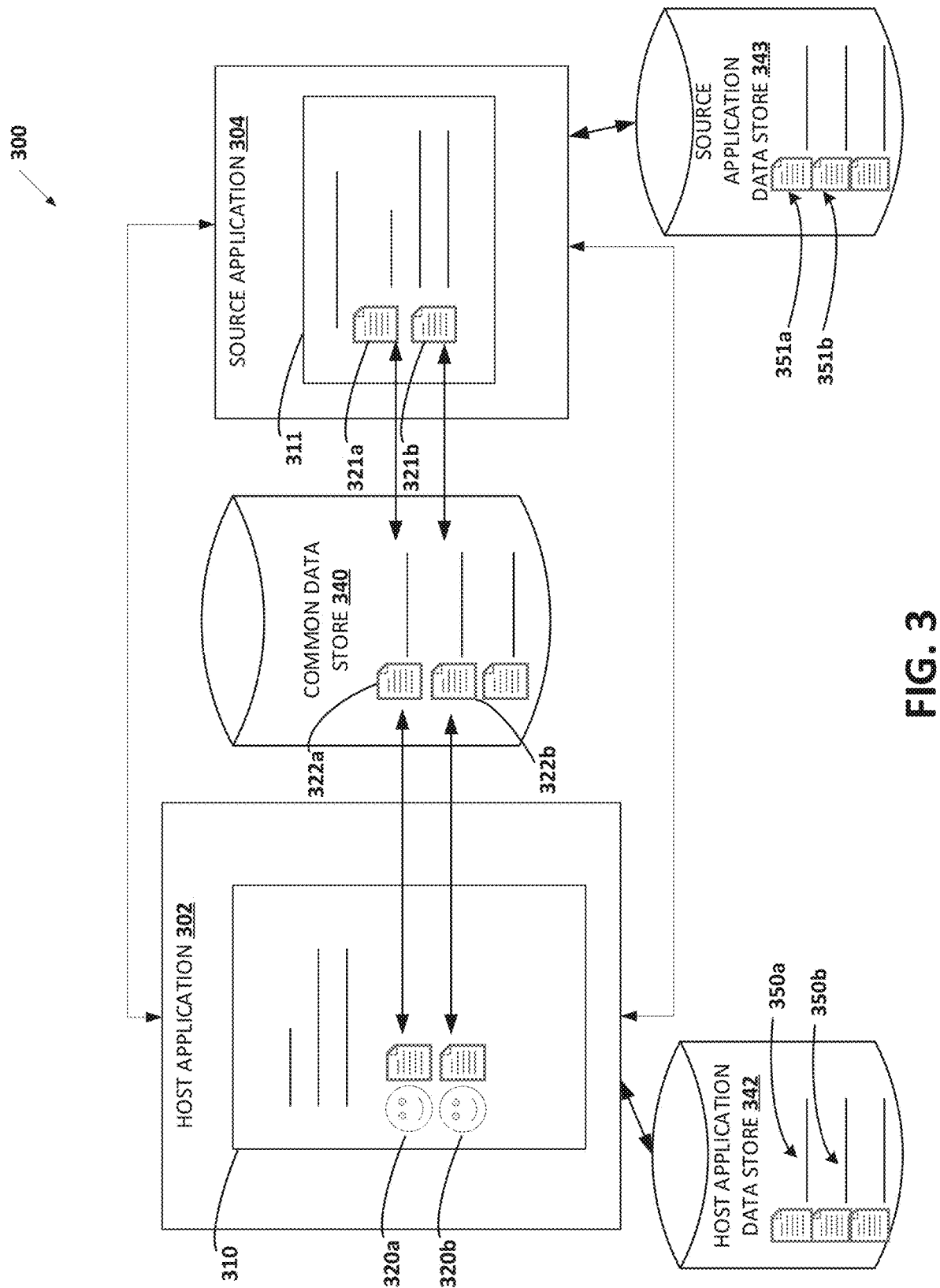
FIG. 3 is a block diagram illustrating synchronization and storage of data between instances of different applications, in accordance with implementations of the disclosure.

FIG. 3 is a block diagram illustrating synchronization and storage of data in a system 300 between instances of different applications such as host application 302 and source application 304, according to some embodiments. While a data object can be generated in either a host application 302 via host application GUI 310 or in source application 304 via source application GUI 311, unlike a source application GUI 311, the host application GUI 310 can contain embedded data objects 320a, 320b. An embedded data object can be associated with a corresponding source application data object. It should be understood that the terms "embedded data object" and "embedded source application data object" can be used interchangeably herein. Further, it should be understood that "source data object", "source application data object", and "source copy of the data object" can be used interchangeably herein. For example, embedded source application data object 320a can be associated with a corresponding source copy of the data object 321a, while embedded data object 320b can be associated with a source data object 321b. Each one of the corresponding data objects can be representative of the same conceptual element (e.g., a task) but may have data or metadata associated with it depending on the application within which it is contained.

In some implementations, each application can have its own exclusive data store for recording the data of the respective application. For example, host application 302 can access host application data store 342 where it can record data as needed for its operation. For example, host application 302 can record data representative of a file of host application 310 and the embedded data objects 320a and 320b contained within it as records 350a and 350b respectively in the host application data store 342. Similarly, source application 304 can access a source application data store 343 where it can record data as needed for its operation. For example, source application 304 can record data representative of a source application GUI 311 and the source data objects 321a and 321b contained within it as records 351a and 351b respectively in the source application data store 343. The records contained in the data stores can include the data objects and the history of the changes made to them. For example, record 350b can include data pertaining to embedded data object 320b and all of the changes that have ever been made to it. In some implementations, host application data store 342 can be exclusively accessible by host application 302 while source application data store 343 can be exclusively accessible by source application 303. Having separate data stores for each application can allow each application to operate according to its respective compliance policies with respect to its data. Further, in order to maintain a common source of up-to-date information for corresponding data objects between the pair of applications, both of the applications can have access to a shared or common data storage location.

Accordingly, in some implementations, both the host application 302 and the source application 304 have access to a common data store 340. Each application can access the common data store 340 directly or through the other application. The common data store 340 can store records 322a, 322b corresponding to data objects of the host application 302 and the source application 304. For example, embedded data object 320a from host application 302 that is associated with source application data object 321 can have a corresponding record 322a saved in the common data store 340. The record 322a can include the data of the most current version of the corresponding data object as well as a record of all the changes that have ever been made to it. In some implementations, whenever a data object is generated or embedded in a host application file or GUI 310, a corresponding record can be created in a common data store. Thereafter, whenever a change is made to the data object, either by a change being made to the embedded data object in the host application 302 or by a change being made to the source data object in the source application 304, the change can be recorded in the common data store. Accordingly, as noted earlier, while the host application 302 and the source application 304 can have different access permissions and rules for different users, regardless of which application a change may have originated from, if a change was made in either application to a data object, that change can be propagated to the corresponding record in the common data store 340.

In some implementations, the common data store may include an embedded data index table that can be managed by the host application 302. For example, if after a source data object 321b is generated and embedded into the host application 302 as embedded source application data object 320b, the source data object 321b is modified through the source application GUI 311, a notification can be sent to the host application 302 from the source application to update the corresponding embedded data object 320b in accordance with the change being made. The update can then be performed in the host application 302 if the access permission allow it or a notification can be then generated regarding the update if the access permission do not allow the user who made the change to the source data object to make changes in the host application 302. However, regardless of whether the user who made the change to the source application data object had the requisite permissions, the change can get recorded in the embedded data index table in the common data store 340 by the host application (or, alternatively, by the source application) to ensure that no changes that are made to the data object are lost.

This common data store 340, or, in some implementation the embedded data index table contained within it, can be used to perform periodic data inconsistency checks. For example, at periodic time intervals, data pertaining to a data object can be compared between the host application data store 342 and the common data store 340. Similarly, at periodic time intervals, data pertaining to a data object can be compared between the source application data store 343 and the common data store 340. If the data pertaining to the data object contained in one data store is inconsistent with the data pertaining to the data object contained in the other data store, a notification of the inconsistency can be generated and presented to a user of one of the applications. Alternatively, if an inconsistency is detected, the data pertaining to the data object common data store 340 can be used to replace the data pertaining to the data object in the other data store and to update the respective application GUI data object accordingly. Embodiments of methods of generating, modifying, and maintaining updated versions of data objects are described below in more detail with reference to FIGS. 4 and 5A-5B. Corresponding methods 400, 500a and 500b may be performed by processing logic that may include hardware (circuitry, dedicated logic, etc.), software (e.g., instructions run on a processing device), or a combination thereof. In some implementations, some or all of the operations of methods 400, 500a and 500b may be performed by host application 150a, source application 150b or integration application manager 160 of FIG. 1.

Figure 4:
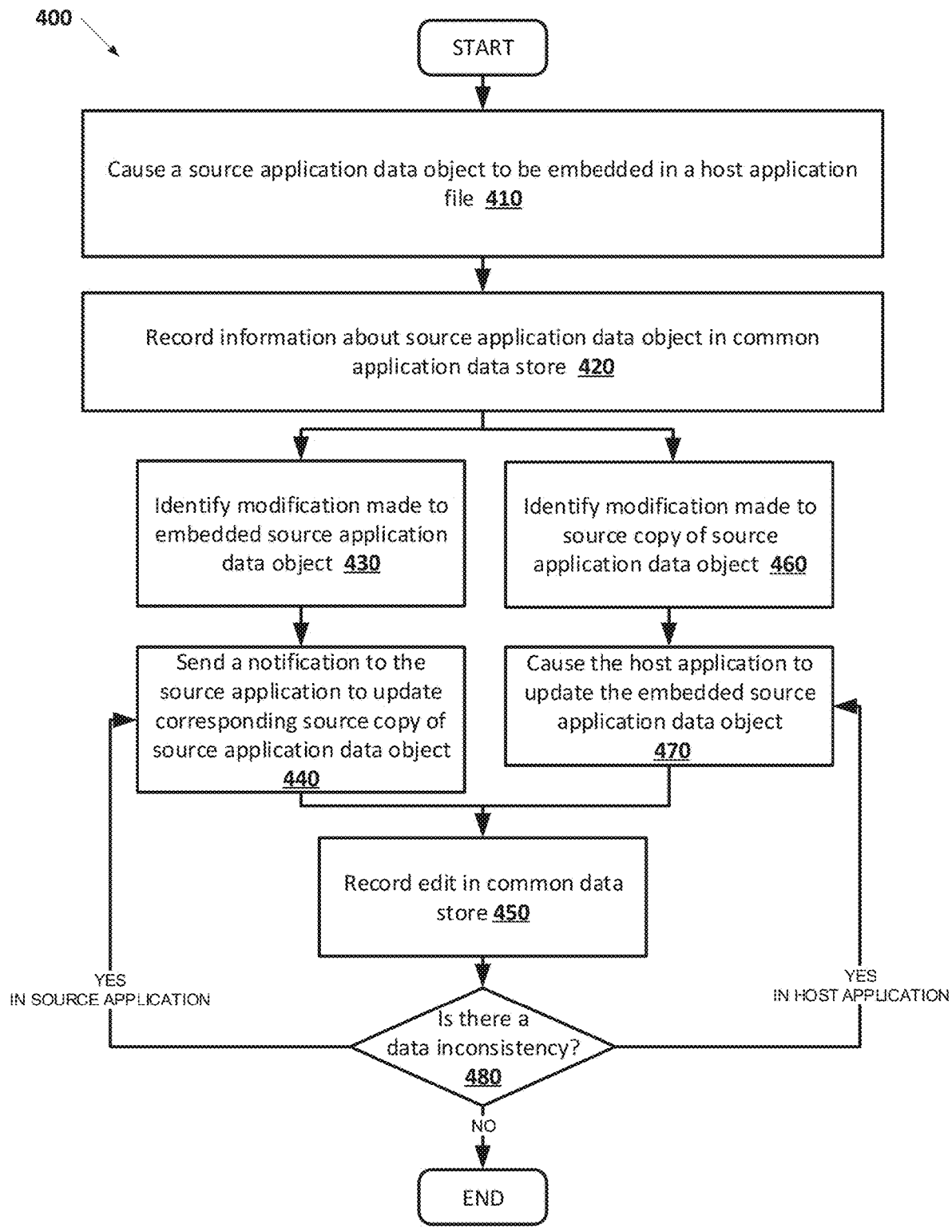
FIG. 4 depicts a flow diagram of a method for embedding and maintaining shared instances of collaborative data across different applications, in accordance with implementations of the present disclosure.

FIG. 4 shows a method 400 for embedding and maintaining shared instances of collaborative data across different applications, in accordance with some implementations. The method describes how data objects are maintained and updated between a source application and host application depending on where changes are made to them.

In some implementations, the method may begin when a source application data object is generated or when it is embedded in a host application file at block 410 (e.g., in response to a request received from source application 150b or integration application manager 160 or in response to user input received via a host application user interface). At block 420, the processing logic can record information associated with the source application data object in a common data store. The information associated with the source application data object can be also recorded in a host application data store and a source application data store. In one implementation, once a data object is created and recorded in a common data store, a corresponding embedded data object and source data object exist respectively in the host application and the source application. Accordingly, the embedded data object can be edited by one or more users having permission to make changes to the data of the host application while the corresponding source data object can be edited by a user having permission to make changes to the data of the source application.

At block 430, a modification made to the embedded source application data object is identified. In some implementations, the modification is identified by the host application when the user enters the modification via the host application user interface. Alternatively, the modification is identified by the integration application manager when receiving a notification from the host application. At block 440, a notification is sent (e.g., by the host application or the integration application manager) to the source application to update a corresponding source copy of the source application data object in the source application data store. Then, at block 450, the modification made to the embedded source application data object can be recorded in the common data store.

At block 460, a change made to the source copy of the source application data object is identified (e.g., by the host application when receiving a notification regarding the change from the source application or by the integration application manager when receiving a notification from the source application). At block 470, the host application is caused to update the embedded source application data object in the host application data store based on the change identified at block 460 and according to access permissions of the host application file. Thereafter, the processing logic can, at block 450, record the change in the common data store to reflect the most recent change made to the source copy of the application data object. In some implementations, the notifications initiated either by the host application or the source application may be repeatedly resent to the receiving application from the sending application until a confirmation or an acknowledgement of the successful transmission (e.g., successful receipt) of the notification is sent back from the receiving application to the sending application.

Because, as mentioned earlier, notifications sent from one application to another may, in some cases not be received by the recipient application, the processing logic can periodically perform a data inconsistency check to compare records of corresponding data objects at block 480. For example, at a predetermined frequency or at the expiration of pre-set time periods, a data inconsistency check of the information associated with the source application data object can be performed at block 480 between the host application data store and the common data store. This can entail checking the record associated with a data object in a common data store and comparing it with, for example, the record of the corresponding data object in the host application data store. If an inconsistency in the data between the two data stores is detected, the data recorded in the host application can be updated based on the corresponding data (e.g., information pertaining to the corresponding data object) recorded in the common data store. Alternatively, in some implementations, if an inconsistency in the data between the two data stores is detected, a notification referring to the data inconsistency associated with the corresponding source application data object can be generated for users with access permissions that allow editing of the host application file. A more detailed description of example methods ensuring that an accurate record of changes to data objects is synchronized between different applications is provided below with reference to FIGS. 5A and 5B.

Figure 5A:
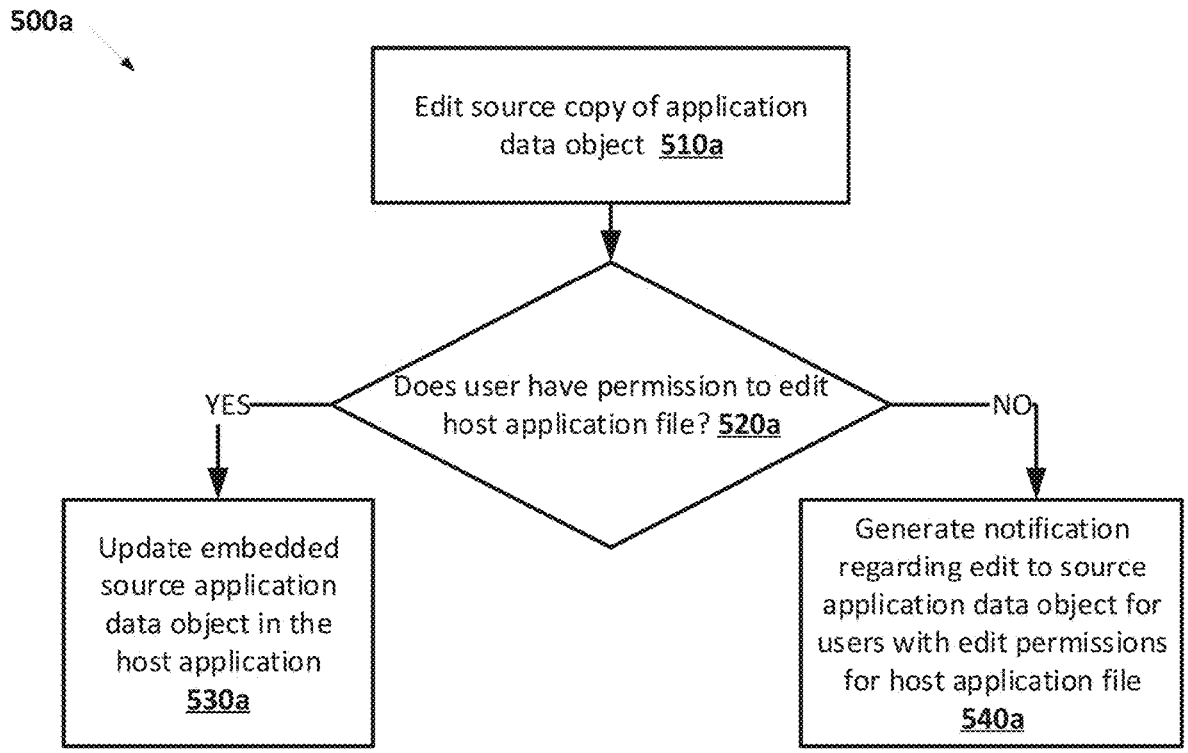
FIGS. 5A and 5B depict flow diagrams of methods for editing and updating shared instances of data between different applications, in accordance with implementations of the present disclosure.
Figure 5B:
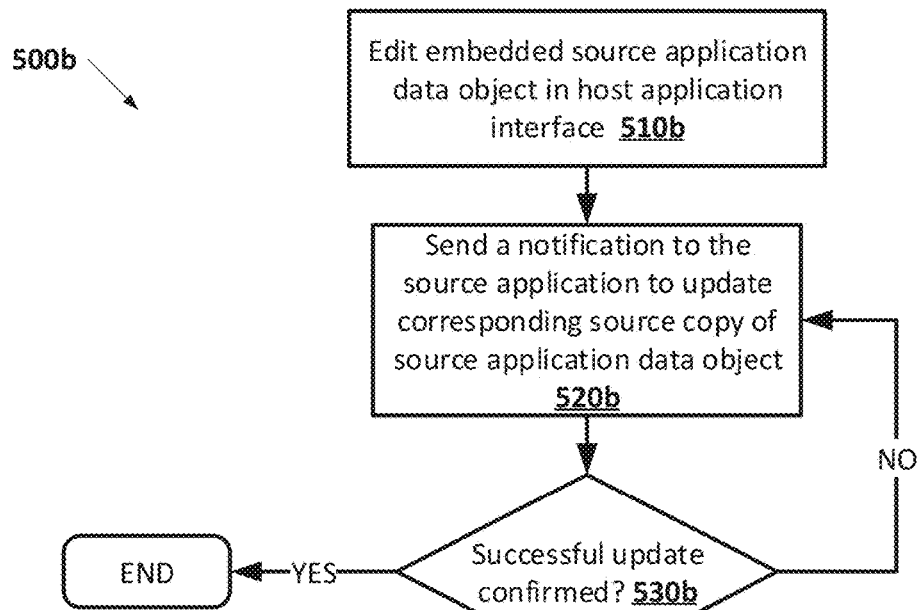

FIGS. 5A and 5B depict flow diagrams of methods 500a and 500b respectively for editing and updating shared instances of data between different applications, in accordance with implementations of the present disclosure. Method 500a relates to edits being made to data objects through a source application while method 500b relates to edits being made to data objects through a host application, in accordance with some implementations.

In some implementations, the processing logic can modify a source copy of the application data object in block 510a. This can occur when a user with access permission for the source application requests to make a change to the source data object. At block 520a, the processing logic can determine whether the user who made the changes to the source data object has the requisite access permission to make edits in the host application. Accordingly, depending on whether the user making the change has permission, in accordance with the access permissions, to make changes to the host application file (e.g., the host application file where a corresponding data object is embedded), the processing logic can proceed to either block 530a or 530b.

If the user who made the change to the source copy of the application data object is determined in block 520a to have permission to make changes to the host application file, then at block 530a, the processing logic can, in response, update the embedded source application data object in the host application data store with the change made by the user. In some implementations, this can entail making an update to the corresponding data object via the host application user interface as well. Alternatively, if the user who made the change to the source copy of the application data object is determined in block 520a to not have permission to make changes to the host application file (e.g., is prohibited from making such changes), then at block 540a, the processing logic can, in response, generate a notification referring to the source application data object for users with access permissions that allow editing of the host application file, the notification indicative of the change made by the user. The notification can indicate the change made by the user and prompt other users that have permission to make changes to the host application file to either accept or reject the change.

In some implementations, the processing logic can, at block 510b, make a modification to the embedded source application data object via the host application user interface. This can occur when a user edits an embedded data object using the host application. Then, at block 520*b*, in response to the modification, the processing logic can send a notification to the source application to update a corresponding source copy of the source application data object in the source application data store. Because in some instances the notification may not be immediately delivered, the processing logic can, at block 530*b*, determine whether the notification was received and a corresponding update was completed at the source application. If an acknowledgement of a receipt of the notification and a successful completion of the update is not received from the source application by the host application, the processing logic can periodically resend the notification to the source application to update the corresponding source copy of the source application data object in the source application data store until a confirmation of a successful update is generated. In this manner, the method ensures that the change gets reflected in the source application copy of the data object and that the corresponding version of the data objects are synchronized between the two applications.

Figure 6:
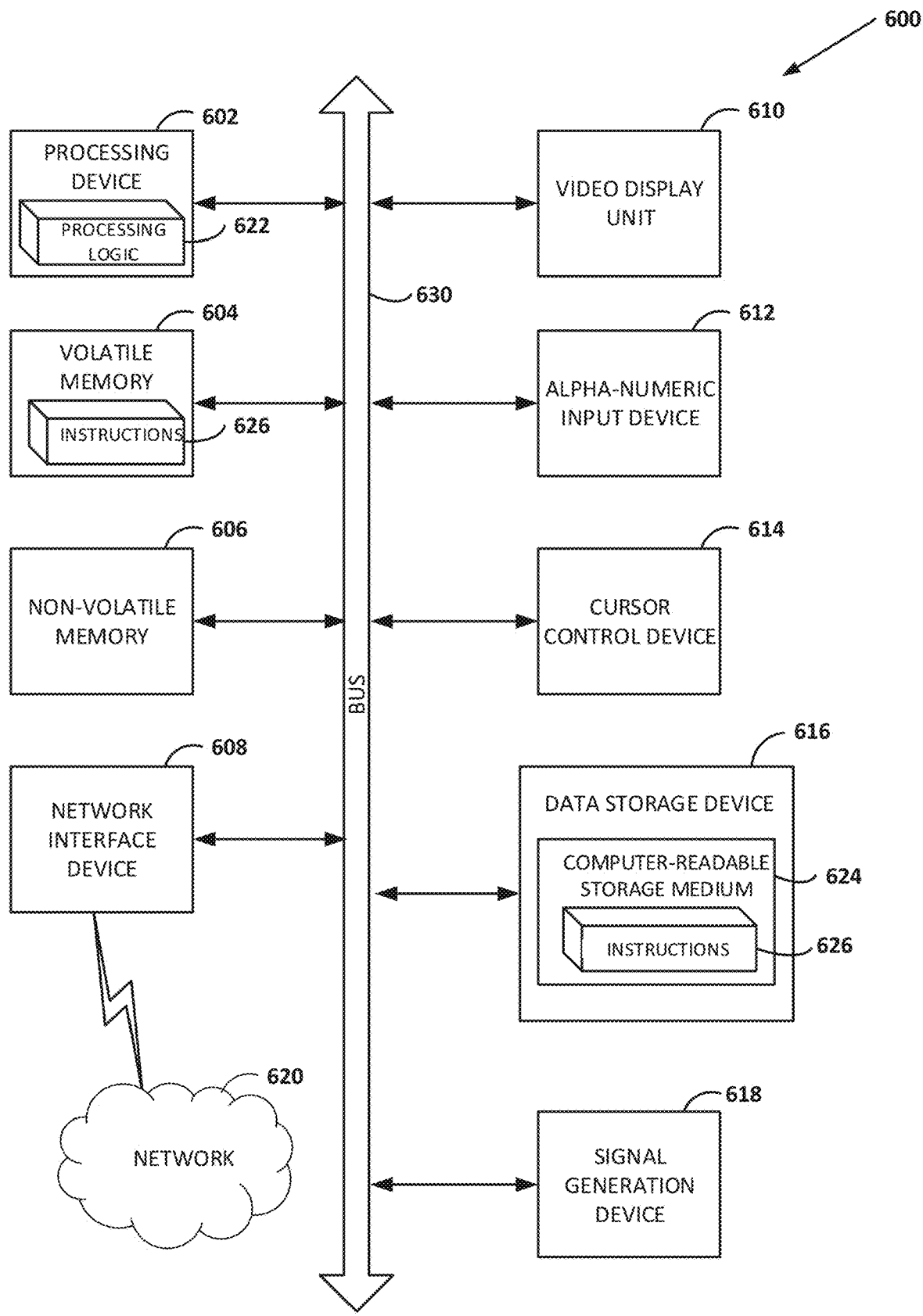
FIG. 6 is a block diagram illustrating an exemplary computer system, in accordance with implementations of the present disclosure.

FIG. 6 is a block diagram illustrating an exemplary computer system, in accordance with implementations of the present disclosure. The computer system 600 can be the server machine 130 or client device 110 in FIG. 1. The machine can operate in the capacity of a server or an endpoint machine in endpoint-server network environment, or as a peer machine in a peer-to-peer (or distributed) network environment. The machine can be a television, a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processing device (processor) 602, a main memory (memory device) 604 (e.g., read-only memory (ROM), flash memory, dynamic random access memory (DRAM) such as synchronous DRAM (SDRAM), double data rate (DDR SDRAM), or DRAM (RDRAM), etc.), a static memory 606 (e.g., flash memory, static random access memory (SRAM), etc.), and a data storage device 618, which communicate with each other via a bus 640.

Processor (processing device) 602 represents one or more general-purpose processing devices such as a microprocessor, central processing unit, or the like. More particularly, the processor 602 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 can also be one or more special-purpose processing devices such as an application specific integrated circuit (ASIC), a field programmable gate array (FPGA), a digital signal processor (DSP), network processor, or the like. The processor 602 is configured to execute instructions 605 (e.g., for predicting channel lineup viewership) for performing the operations discussed herein.

The computer system 600 can further include a network interface device 608. The computer system 600 also can include a video display unit 610 (e.g., a liquid crystal display (LCD) or a cathode ray tube (CRT)), an input device 612 (e.g., a keyboard, and alphanumeric keyboard, a motion sensing input device, touch screen), a cursor control device 614 (e.g., a mouse), and a signal generation device 620 (e.g., a speaker).

The data storage device 618 can include a non-transitory machine-readable storage medium 624 (also computer-readable storage medium) on which is stored one or more sets of instructions 605 (e.g., for generating, embedding, and updating data objects in different applications) embodying any one or more of the methodologies or functions described herein. The instructions can also reside, completely or at least partially, within the main memory 604 and/or within the processor 602 during execution thereof by the computer system 600, the main memory 604 and the processor 602 also constituting machine-readable storage media. The instructions can further be transmitted or received over a network 630 via the network interface device 608.

In one implementation, the instructions 605 include instructions for generating, embedding, maintaining, and updating data objects across different applications. While the computer-readable storage medium 624 (machine-readable storage medium) is shown in an exemplary implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

Reference throughout this specification to "one implementation," or "an implementation," means that a particular feature, structure, or characteristic described in connection with the implementation is included in at least one implementation. Thus, the appearances of the phrase "in one implementation," or "in an implementation," in various places throughout this specification can, but are not necessarily, referring to the same implementation, depending on the circumstances. Furthermore, the particular features, structures, or characteristics may be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, circuits, modules, and so on have been described with respect to interact between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Finally, implementations described herein include collection of data describing a user and/or activities of a user. In one implementation, such data is only collected upon the user providing consent to the collection of this data. In some implementations, a user is prompted to explicitly allow data collection. Further, the user may opt-in or opt-out of participating in such data collection activities. In one implementation, the collect data is anonymized prior to performing any analysis to obtain any statistical patterns so that the identity of the user cannot be determined from the collected data.

What is claimed is:

1. A method comprising:
receiving user input indicating a command to embed a source application data object created in a source application into a host application, wherein the source application and the host application are data management applications of different types;
in response to the user input, causing, by a processing device, the source application data object created in the source application to be embedded in a host application file of the host application;
recording information associated with the source application data object in a common data store accessible to the source application and the host application, wherein the information associated with the source application data object is also recorded in a host application data store and a source application data store, wherein the host application data store is accessible to the host application but not the source application, and the source application data store is accessible to the source application but not the host application;
identifying a modification made to the embedded source application data object via a host application user interface of the host application;
sending a notification to the source application to update a corresponding source copy of the source application data object in the source application data store based on the modification made to the embedded source application data object, and recording the modification made to the embedded source application data object in the common data store;
identifying a change made to the source copy of the source application data object via a source application user interface of the source application; and
causing, by the processing device, the host application to update the embedded source application data object in the host application data store based on the change made to the source copy of the source application data object and according to access permissions of the host application file, and recording the change made to the source copy of the source application data object in the common data store.

2. The method of claim 1, wherein:
identifying the change made to the source copy of the source application data object comprises receiving a notification, initiated by the source application, regarding the change made to the source copy of the source application data object; and
causing the host application to update the embedded source application data object in the host application data store comprises:
determining whether the access permissions allow a user to make changes to the host application file; and
responsive to a determination that the access permissions allow the user to make changes to the host application file, causing the embedded source application data object to be updated in the host application data store with the change made by the user.

3. The method of claim 1, further comprising:
identifying a second change made to the source copy of the application data object by a second user;
determining whether the access permissions allow the second user to edit the host application file; and
responsive to a determination that the access permissions prohibit the second user from editing the host application file, generating a notification referring to the source application data object for users with access permissions that allow editing of the host application file, the notification indicative of the change made by the second user.

4. The method of claim 1, further comprising:
upon identifying the modification made to the embedded source application data object via the host application user interface, periodically resending the notification to the source application to update the corresponding source copy of the source application data object in the source application data store until a confirmation of a successful update is generated.

5. The method of claim 1, further comprising:
periodically performing a data inconsistency check of the information associated with the source application data object between the host application data store and the common data store.

6. The method of claim 5 further comprising:
responsive to detecting a data inconsistency, updating data recorded in the host application data store based on corresponding data recorded in the common data store.

7. The method of claim 5 further comprising:
responsive to detecting a data inconsistency, generating a notification referring to the data inconsistency associated with the source application data object for users with access permissions that allow editing of the host application file.

8. A system comprising: a memory device; and a processing hardware device, coupled to the memory device, wherein the processing hardware device to: receive user input indicating a command to embed a source application data object created in a source application into a host application, wherein the source application and the host application are data management applications of different types; in response to the user input, cause the source application data object created in the source application to be embedded in a host application file of the host application; record information associated with the source application data object in a common data store accessible to the source application and the host application, wherein the information associated with the source application data object is also recorded in a host application data store and a source application data store, wherein the host application data store is accessible to the host application but not the source application, and the source application data store is accessible to the source application but not the host application; identify a modification made to the embedded source application data object via a host application user interface of the host application; send a notification to the source application to update a corresponding source copy of the source application data object in the source application data store based on the modification made to the embedded source application data object, and recording the modification made to the embedded source application data object in the common data store; identify a change made to the source copy of the source application data object via a source application user interface of the source application; and cause the host application to update the embedded source application data object in the host application data store based on the change made to the source copy of the source application data object and according to access permissions of the host application file, and record the change made to the source copy of the source application data object in the common data store.

9. The system of claim 8, wherein:
identifying the change made to the source copy of the source application data object comprises: receiving a notification, initiated by the source application, regarding the change made to the source copy of the source application data object; and
causing the host application to update the embedded source application data object in the host application data store comprises:
determining whether the access permissions allow a user to make changes to the host application file; and
responsive to a determination that the access permissions allow the user to make changes to the host application file, causing the embedded source application data object to be updated in the host application data store with the change made by the user.

10. The system of claim 8, wherein the processing hardware device is further to: identify a second change made to the source copy of the application data object by a second user; determine whether the access permissions allow the second user to edit the host application file; and responsive to a determination that the access permissions prohibit the second user from editing the host application file, generate a notification referring to the source application data object for users with access permissions that allow editing of the host application file, the notification indicative of the change made by the second user.

11. The system of claim 8, wherein the processing hardware device is further to: upon identifying the modification made to the embedded source application data object via the host application user interface, periodically resend the notification to the source application to update the corresponding source copy of the source application data object in the source application data store until a confirmation of a successful update is generated.

12. The system of claim 8, wherein the processing hardware device is further to: periodically perform a data inconsistency check of the information associated with the source application data object between the host application data store and the common data store.

13. The system of claim 12, wherein the processing hardware device is further to: responsive to detecting a data inconsistency, update data recorded in the host application data store based on corresponding data recorded in the common data store.

14. The system of claim 12, wherein the processing hardware device is further to: responsive to detecting a data inconsistency, generate a notification referring to the data inconsistency associated with the source application data object for users with access permissions that allow editing of the host application file.

15. A non-transitory computer readable storage medium comprising instructions that, when executed by a processing device, cause the processing device to:
receive user input indicating a command to embed a source application data object created in a source application into a host application, wherein the source application and the host application are data management applications of different types;
in response to the user input, cause the source application data object created in the source application to be embedded in a host application file of the host application;
record information associated with the source application data object in a common data store accessible to the source application and the host application, wherein the information associated with the source application data object is also recorded in a host application data store and a source application data store, wherein the host application data store is accessible to the host application but not the source application, and the source application data store is accessible to the source application but not the host application;
identify a modification made to the embedded source application data object via a host application user interface of the host application;
send a notification to the source application to update a corresponding source copy of the source application data object in the source application data store based on the modification made to the embedded source application data object, and recording the modification made to the embedded source application data object in the common data store;
identify a change made to the source copy of the source application data object via a source application user interface of the source application; and
cause the host application to update the embedded source application data object in the host application data store based on the change made to the source copy of the source application data object and according to access permissions of the host application file, and record the change made to the source copy of the source application data object in the common data store.

16. The non-transitory computer readable storage medium of claim 15, wherein:
identifying the change made to the source copy of the source application data object comprises: receiving a notification, initiated by the source application, regarding the change made to the source copy of the source application data object; and
causing the host application to update the embedded source application data object in the host application data store comprises:
determining whether the access permissions allow a user to make changes to the host application file; and
responsive to a determination that the access permissions allow the user to make changes to the host application file, causing the embedded source application data object to be updated in the host application data store with the change made by the user.

17. The non-transitory computer readable storage medium of claim 15, wherein the instructions, when executed by a processing device, further cause the processing device to:
identify a second the change made to the source copy of the application data object by a second user;
determine whether the access permissions allow the second user to edit the host application file; and
responsive to a determination that the access permissions prohibit the second user from editing the host application file, generate a notification referring to the source application data object for users with access permissions that allow editing of the host application file, the notification indicative of the change made by the second user.

18. The non-transitory computer readable storage medium of claim 15, wherein the instructions, when executed by a processing device, further cause the processing device to:
upon identifying the modification made to the embedded source application data object via the host application user interface, periodically resend the notification to the source application to update the corresponding source copy of the source application data object in the source application data store until a confirmation of a successful update is generated.

19. The non-transitory computer readable storage medium of claim 15, wherein the instructions, when executed by a processing device, further cause the processing device to:
periodically perform a data inconsistency check of the information associated with the source application data object between the host application data store and the common data store.

20. The non-transitory computer readable storage medium of claim 15, wherein the instructions, when executed by a processing device, further cause the processing device to:
responsive to detecting a data inconsistency, generate a notification referring to the data inconsistency associated with the source application data object for users with access permissions that allow editing of the host application file.

* * * * *